May 4, 1965      E. W. LEIVE      3,181,670
SPRING DISENGAGED ELECTROMAGNETIC CLUTCH OR BRAKE
Filed Jan. 10, 1962
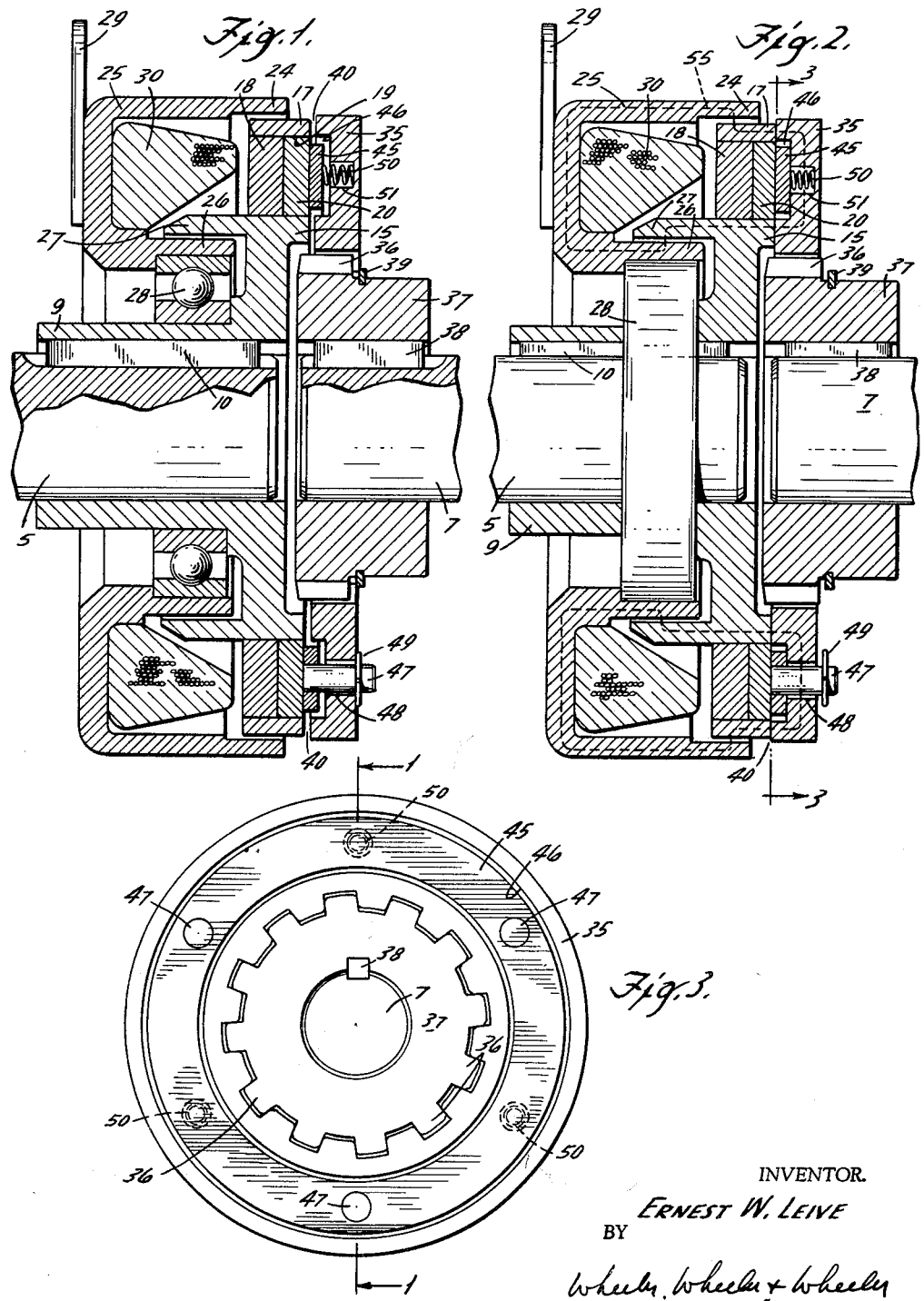
INVENTOR.
ERNEST W. LEIVE
BY
Wheeler, Wheeler + Wheeler
ATTORNEYS.

United States Patent Office 3,181,670
Patented May 4, 1965

3,181,670
SPRING DISENGAGED ELECTROMAGNETIC CLUTCH OR BRAKE
Ernest W. Leive, Wauwatosa, Wis., assignor to Stearns Electric Corporation, Milwaukee, Wis., a corporation of Wisconsin
Filed Jan. 10, 1962, Ser. No. 165,433
3 Claims. (Cl. 192—84)

This invention relates to an electromagnetic clutch or brake, having magnet and armature friction surfaces electromagnetically engaged and separated by a spring acting through a floating ring which carries part of the friction surface.

It is not unusual to provide the armature of a clutch or brake with spring means for retracting it to overcome the effect of residual magnetism when the magnet is deenergized. However, when the releasing spring has a fixed anchorage, the bias of that spring has to be overcome by the electromagnet and this reduces the torque of the clutch or brake.

In the instant device, the spring and the part through which it acts to move the armature from the magnet are unitarily assembled with the armature and provide a part of its friction surface. While it is still necessary for the electromagnet to overcome the bias of the spring means, before the armature can be fully engaged, this does not, in the instant device, result in torque reduction because the spring means acts through a ring which provides a part of the friction surface of the armature, thus contributing to torque transmission.

In the drawings:

FIG. 1 is a view taken in cross section on the line 1—1 of FIG. 3 and showing in section a magnetic clutch embodying the invention.

FIG. 2 is a view similar to FIG. 1 showing the position of the parts when the electromagnet is energized.

FIG. 3 is a view taken in section on line 3—3 of FIG. 2.

It will be understood that while an electromagnetic clutch has been selected as a typical embodiment of the invention, the invention is similarly applicable to brakes.

The clutch illustrated serves to connect a driving shaft 5 with a driven shaft 7. The hub 9 connected to shaft 5 by key 10 carries an annular pole 15 from which an annular polar extension 17 is supported by a ring 18 of material which is relatively a poor conductor of magnetism. The annular channel 19 between the polar extensions and the supporting ring 18 may conveniently be filled with an annular body 20 of friction material comparable to that used in brake linings, and usually comprising asbestos fiber with a resinous bond.

The polar extensions 15 and 17 are energized by an electromagnet which, in the device, does not rotate with shaft 5. The magnet body 25 has an inner annular pole 26 which peripherally laps the inner end 27 of the pole 15, the air gap being as small as is practicable. The bearing 28 maintains the magnet body 25 accurately located respecting the hub 9.

The magnet body has an outer annular pole portion 24 which laps the outer annular polar extension 17 with peripheral spacing as small as is practicable. The magnet body 25 is restrained against rotation by means of an arm 29. It is energized by a coil 30 in the annular channel between its poles 26 and 24.

The armature 35 is mounted on splines 36 of a driven element 37 connected to the driven shaft 7 by a key 38. The retaining ring 39 of the driven hub secures the armature against undue separation from the driving friction face 40, which includes the end faces of the polar extensions 15 and 17 and the intervening friction insert 20.

The present invention contemplates the provision of a pressure ring 45 for which the armature 35 is provided with an annular channel at 46. Ring 45 need not be magnetically responsive. It is, however, possible to use magnetic material in ring 45 in the instant device, since it engages no metal of the driving element. As shown, it contacts the friction material only.

Any desired means is employed for connecting the pressure ring to the armature to secure these parts against relative rotation while accommodating limited axial movement. By way of example, I have illustrated the three pins 47 used for this purpose, these pins being fixed in the pressure ring 45 and reciprocable in holes 48 of the armature 35. The pins carry slit collars 49 which limit the outward displacement of the pressure ring 45 respecting the armature to bias of the spring means presently described.

A wide variety of spring means may be used to provide the desired bias for breaking the tension of the driving poles for the driven hub when the magnet is deenergized. Consequently, it will be understood that the spring means illustrated is merely by way of exemplification. Three compression springs 50 are used at 120° spacing, being equidistant between the driving pins 47. The armature has sockets at 51 for these compression springs.

When the coil 30 is energized, magnetic flux flows through the magnet body 25 and the driving polar extensions and the armature upon the broken line indicated at 55 in FIG. 2. The friction surfaces of the armature are drawn into contact with the driving friction face, this including the ends of the driving poles 17 and 15. The compression of springs 50 has to be overcome to permit the armature to reach the position shown in FIG. 2 but the force required to overcome the bias of the springs 50 contributes to the driving torque because the springs seat upon the floating ring 45 to urge this into contact with the friction material 20. Thus the floating ring 45 is really a part of the armature, although, as above noted, it is not necessarily magnetic and, in the instant device, it does not contact magnetic material but only contacts the non-magnetic friction insert 20.

When the magnet is deenergized, the expansion of the compression springs 50 overcomes the residual magnetism that continues to attract the armature to the poles 15 and 17. Since the floating armature ring 45 does not engage the poles of the driving hub, it is not itself subject to substantial residual magnetism and, when the armature body 35 and the floating ring 45 reach the maximum separation permitted by the collar 49 on pins 47, the floating ring 45 is wholly relieved of the bias of the springs 50 and there is no drag whatever between it and the rotating non-magnetic friction material 20 of the driving hub.

As will be appreciated by those skilled in the art, it is broadly immaterial whether the magnet member or the armature member moves in response to electromagnetic energization and deenergization. It is also broadly immaterial whether the floating ring is mounted on one or the other of these members, or whether it is used to develop or to avoid friction. So far as the release of residual magnetism is concerned, some of the advantages of the present invention would be achieved if an anti-friction bearing were carried by the floating ring.

As has already been made apparent, the invention is applicable to brakes as well as to clutches and it is, therefore, broadly immaterial whether the magnet member and armature member are both rotatable. In the clutch, as well as the brake, there is relative rotation between them, resisted frictionally by engagement of the armature with the polar extensions when the electromagnet is energized.

One of the advantages of the present structure lies in the fact that it will continue to function throughout the

I claim:
1. In a device of the character described,
first and second hubs,
radially spaced annular poles on the first hub,
means comprising an electromagnet fixed against rotation and having fixed poles lapping the annular poles on the first hub and having radial clearance accommodating relative rotation between the fixed poles and the annular poles for electromagnetically energizing the poles first mentioned,
an armature reciprocably splined on the second hub for movement to and from the annular poles,
a relatively non-magnetic filler between the annular poles and provided with a friction face,
a floating ring carried by the armature and engageable with said filler face,
compression spring means interposed between the ring and the armature and biasing the armature away from the ring, and
means for connecting the ring with the armature against rotation respecting the armature, and
means for limiting the separation of the armature and the ring.

2. A device according to claim 1, in which said last mentioned means comprises headed pins connected with the ring and for which the armature has bearing openings, the armature having a face channel in which the ring is disposed and having sockets in which the spring means is disposed.

3. The device of claim 1 in which the relatively non-magnetic material comprises a friction material against which the ring bears, the ring being of less radial extent than the spacing between the annular poles and being so disposed as to be free of contact with the annular poles.

References Cited by the Examiner

UNITED STATES PATENTS

| 2,584,116 | 2/52 | Duyck. |
| 2,729,318 | 1/56 | Harter. |
| 2,823,776 | 2/58 | Pierce. |
| 2,912,088 | 11/59 | Breyer. |

FOREIGN PATENTS 474,053  10/14  France.

DAVID J. WILLIAMOWSKY, *Primary Examiner.*

THOMAS J. HICKEY, *Examiner.*